United States Patent
Nesseth

[15] 3,687,311
[45] Aug. 29, 1972

[54] MANURE TRANSFER AND STORAGE SYSTEM

[72] Inventor: Clinton A. Nesseth, Rt. #1, Box 29, Dafter, Mich. 49724

[22] Filed: March 24, 1971

[21] Appl. No.: 127,582

[52] U.S. Cl............214/16 R, 198/226, 198/DIG. 18
[51] Int. Cl...............................................B65g 25/08
[58] Field of Search .214/16 R, 41; 198/226, DIG. 18

[56] References Cited

UNITED STATES PATENTS

| | | | |
|---|---|---|---|
| 3,103,276 | 9/1963 | Schmitzer.................. | 198/226 |
| 2,238,944 | 4/1941 | Muller et al. .......... | 198/226 X |
| 1,843,593 | 2/1932 | Anderson............. | 214/16 R X |

*Primary Examiner*—Robert G. Sheridan
*Attorney*—Donnelly, Mentag & Harrington

[57] ABSTRACT

A manure transfer and storage system for use in an animal housing building having a floor, and which includes a manure collection pit disposed beneath the floor of the building for receiving manure, and transfer means disposed under the building and connected to the lower end of the collection pit for transferring manure from the collection pit to the exterior of the building. A manure storage means is provided at a point exterior of the building for receiving manure from the transfer means and storing the manure for future use. The transfer means is also provided with a spreader loading station for transferring manure to a spreading machine.

6 Claims, 6 Drawing Figures

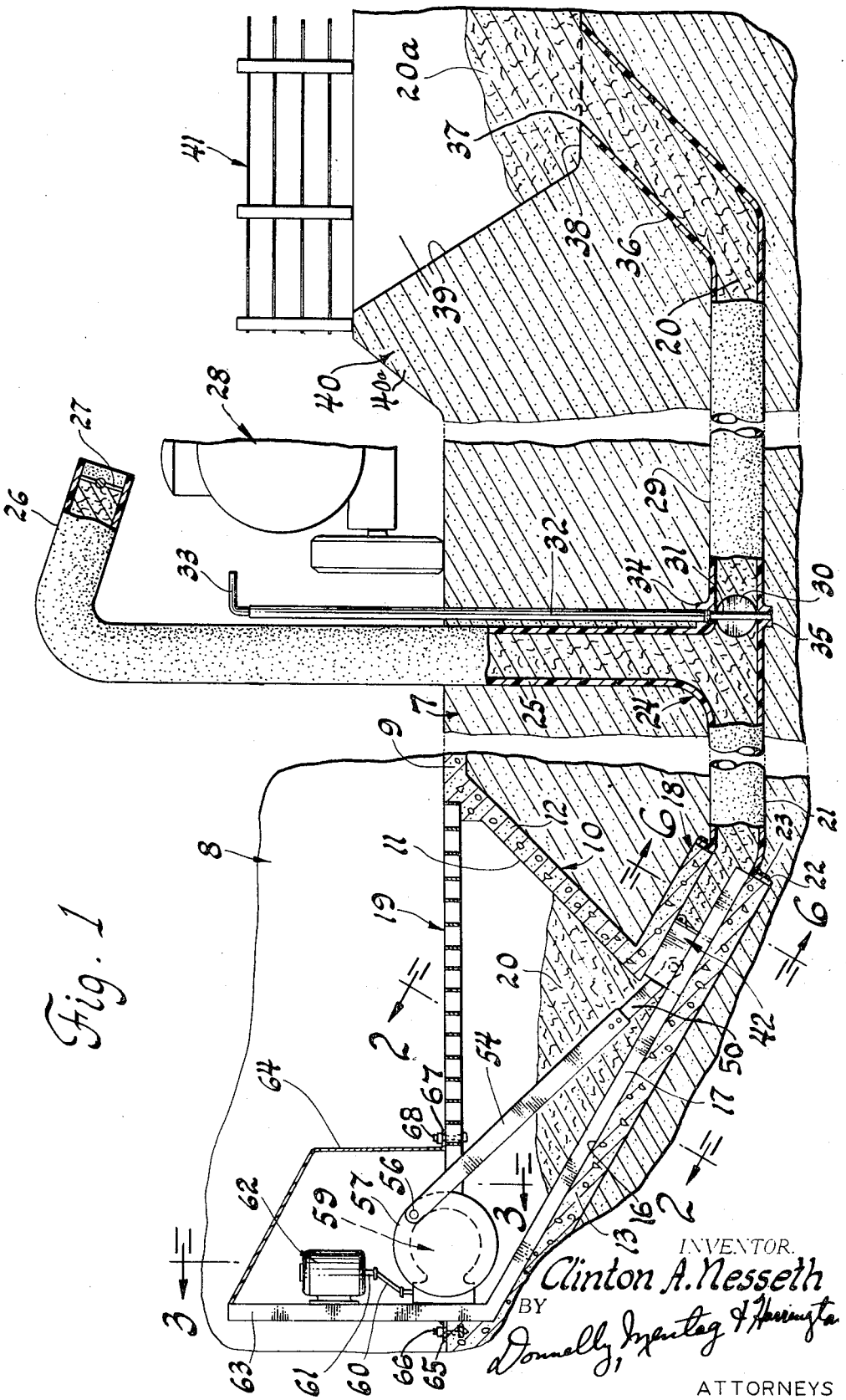

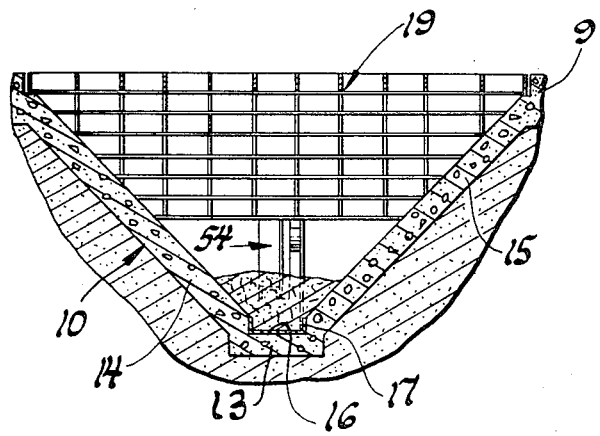
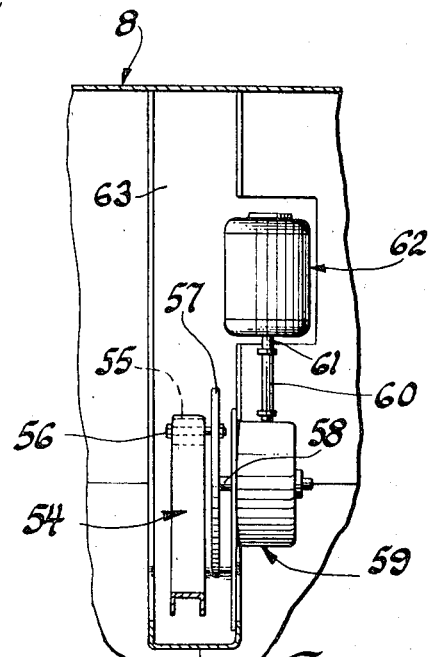
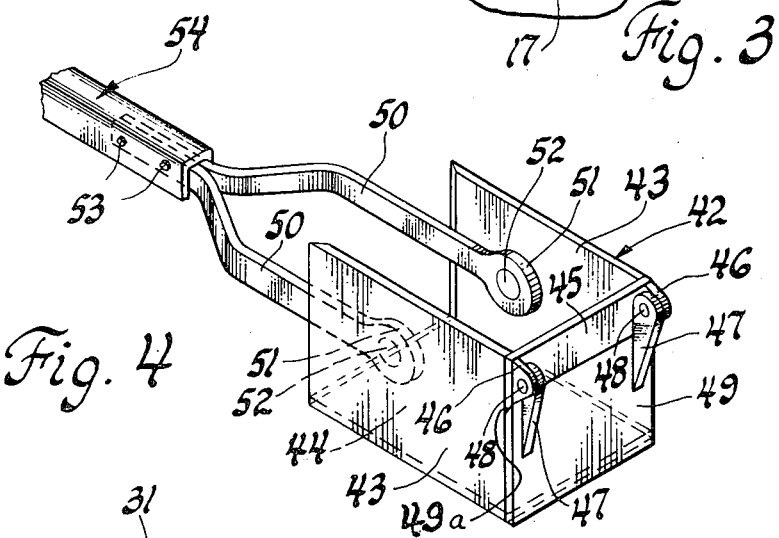
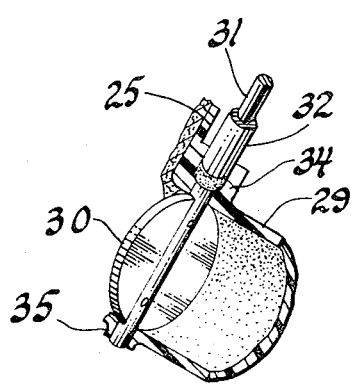
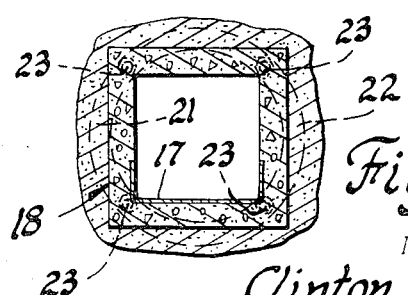

MANURE TRANSFER AND STORAGE SYSTEM

SUMMARY OF THE INVENTION

This invention relates generally to an apparatus for transferring manure and more particularly to a novel and improved manure transfer and storage system.

Manure transfer apparatuses have been provided heretofore. One prior art apparatus of this type comprises a heavy chain with angle iron paddles for scraping manure from a gutter or pit, and usually to carry the manure up an incline and drop it off at the end of the incline into a pile or into a spreader for hauling the manure to a field. A disadvantage of this type of prior art manure transferring apparatus is that it is designed for use where bedding is used to soak up the manure liquids, and accordingly, it does not work well with soft manures containing little bedding material. Furthermore, due to the exposed chain, it freezes during cold weather, and the manure goes only as far as the chain carries it. If the pile of manure at the end of the incline is as high as the discharge end of the incline, which is usually about 7' high, then the manure is carried back into the barn on the return side of the chain. In order to overcome this problem, many farmers make it a practice to continue to spread the manure throughout the winter season. The last mentioned practice is being attacked by ecologists who are concerned with pollution, because manure spread on snow-covered or frozen fields freezes in the winter and the manure fluids become part of the run-off on the ground during Spring rains since such fluids do not soak into the ground.

A further prior art manure transfer and storage system is one known as a liquid manure system. It consists of a huge tank built under a barn and which is nearly as large as the barn, and nearly as expensive as the barn. As the manure is scraped into the tank, considerable water is added so that the contents of the tank can be handled as a liquid.

Accordingly, in view of the foregoing, it is the primary object of the present invention to provide a novel and improved manure transfer and storage system which overcomes the aforementioned disadvantages of the prior art transfer and storage systems.

It is another object of the present invention to provide a manure transfer and storage system which permits manure to be moved directly to a main storage area which is located remotely from a barn. The main storage area comprises a large storage facility which can be constructed at a minimum of cost, and which permits the handling of high phosphate animal wastes in a manner and of a capacity which makes pollution control a practical and convenient matter. The manure storage facility can handle excess liquid materials with no problems and it is not hindered by surface freezing during cold weather.

It is a further object of the present invention to provide a novel and improved manure transferring storage system for use in an animal or other building which is provided with a floor. The manure transfer and storage system includes a manure collection pit disposed beneath the floor of the building for receiving manure removed from the floor of the building. The transfer means is disposed under the building and is connected to the lower end of the collection pit. The manure storage means is located exteriorly of the building for storing manure in piles, and the transfer means transfers the manure from said collection pit to the bottom of the manure piled and stored in the manure storage means. The transfer means includes a pump means connected to the lower end of the collection pit, power means for operating the pump, and conduit means connected to the discharge end of the pump means for conducting manure pushed by the pump means from the collection pit to the manure storage means.

It is still another object of the present invention to provide a novel and improved manure transfer and storage system which is simple and compact in construction, economical to manufacture, and efficient in operation.

Other objects, features and advantages of this invention will be apparent from the following detailed description, appended claims, and the accompanying drawings.

BRIEF DESCRIPTION OF THE DRAWINGS

FIG. 1 is a broken elevational section view of a manure transfer and storage system made in accordance with the principles of the present invention.

FIG. 2 is a fragmentary, elevational section view of the structure illustrated in FIG. 1, taken along the line 2—2 thereof, and looking in the direction of the arrows.

FIG. 3 is an elevational section view of the structure illustrated in FIG. 1, taken along the line 3—3 thereof, and looking in the direction of the arrows.

FIG. 4 is a fragmentary perspective view of a pump piston employed in the manure transfer structure illustrated in FIG. 1.

FIG. 5 is a fragmentary, broken perspective view of a directional flow control valve employed in the structure illustrated in FIG. 1.

FIG. 6 is a fragmentary, enlarged, elevational section view of the structure illustrated in FIG. 1, taken along the line 6—6 thereof, and looking in the direction of the arrows.

DESCRIPTION OF THE PREFERRED EMBODIMENT

Referring now to the drawings, and in particular to FIG. 1, the numeral 7 generally indicates the ground and the numeral 8 generally indicates a fragmentary portion of a barn or other like building for housing animals. The numeral 9 indicates a cement floor in the building, and in which has been provided an opening beneath which is disposed a manure collection pit generally indicated by the numeral 10. The manure collection pit 10 is open on its upper end and it includes a front wall 12 which is provided with an inner surface 11 that slopes downwardly and inwardly. The rear wall 13 of the pit 10 also slopes downwardly and inwardly toward the front wall 12. As shown in FIG. 2, the side walls 14 and 15 of the pit also slope downwardly and inwardly in a converging manner. As illustrated, the downwardly and inwardly sloping pit walls 12, 13, 14 and 15 are integrally formed with the building floor 9, and they are indicated as being formed from cement. However, it will be understood that these pit walls may also be made from any other suitable material, as for example, sheet metal or the like.

As shown in FIG. 2, the bottom wall 13 has a longitudinally extended slot 16 formed on its inner face in which is disposed a pump piston guide channel 17. As shown in FIG. 1, the front, rear and side walls of the collection pit 10 slope downwardly and inwardly so as to converge at the inlet end of a pump cylinder 18. The pump cylinder 18 is illustrated as being formed integrally with the collection pit walls, from cement. However, it will be understood that the pump cylinder 18 may be made from any other suitable material as, for example, a suitable metal. FIG. 6 shows that the pump cylinder 18 is made so as to have a square cross section. However, it will be understood that it could be circular in cross section if the pump piston were so shaped. In the illustrated embodiment, the hereinafter described pump piston is shaped square in cross section. As shown in FIGS. 1 and 6, the pump piston guide channel 17 extends downwardly through the pump cylinder 18.

As shown in FIG. 1, the open upper end of the collection pit 10 is enclosed by a removable grate pit cover 19. Manure laying on the floor 9 of the building 8 may be scraped into the collection pit 10 by any suitable means, as for example a tractor with a scraper blade. The manure is indicated in FIG. 1 by the numeral 20. It will be seen that the manure 20 falls by gravity through the grate 19 and down over the sloping surfaces of the pit walls and into the inlet end of the pump piston cylinder 18.

As shown in FIGS. 1 and 6, the inlet end of a circular conduit portion 21 is provided with a flange 22 which is attached by suitable bolt means 23 to the outlet end of the cylinder 18. The outlet end of the circular conduit portion 21 is connected to one horizontal leg of a Tee fitting 24. A second conduit or riser 25 has its lower end connected to the vertical or upwardly extended leg of the Tee fitting 24. The second conduit 25 extends upwardly and above the ground level and its upper end 26 is turned downwardly to provide a discharge end at a spreader loading station for conducting manure from the pump means 42 to a spreader 28 disposed under the discharge end 26. A damper type flow control valve 27 is operatively mounted in the outer end of the second conduit discharge end 26 for closing off the discharge end 26 or for opening said end to permit manure to be discharged therefrom. The outlet of the discharge end 26 is disposed at a downwardly inclined angle to aid draining and to prevent liquids from running back along the under side of the conduit discharge end 26. The second conduit 25 thus permits a loader 28 to be loaded with manure directly from the pump means 42. A third portion 29 of a first conduit has its inlet end connected to the other horizontal leg of the Tee fitting 24, as shown in FIG. 1. A second damper type valve 30 is operatively mounted in said other horizontal leg of the Tee fitting 24 to provide a second flow control valve for controlling the flow of manure into the vertical conduit 25 for loading manure into the loader 28 or for permitting the manure to be transferred into the conduit portion 29.

The control valve 30 is operatively mounted on a vertical control rod or shaft 31. The shaft 31 is suitably journaled in the bosses 34 and 35 which are integrally formed in said other horizontal leg of the Tee fitting 24. The valve control rod 31 extends upwardly through a vertical pipe 32 which has its lower end fixed in the boss 34 and sealed by a suitable sealing means. The upper end of the pipe 32 extends above the ground and the valve rod 31 extends upwardly beyond the upper end of the pipe 32 and it is turned over at a right angle to form an operative valve handle 33 for operating the valve 30 between open and closed positions.

As shown in FIG. 1, the outlet end of the conduit portion 29 is attached to the inlet end of an upwardly inclined third conduit portion 36 which has its discharge end 37 in the bottom wall 38 of a manure storage means generally indicated by the numeral 40. The bottom wall 38 of the manure storage means 40 is preferably disposed below the ground level. A soil wall 40a may be formed around the manure storage means 40. The side walls of the manure storage means 40 are provided on their inner side with upwardly and outwardly sloping surfaces 39 which terminate at the bottom end thereof at the bottom wall 38. A suitable fence means 41 may be mounted on the upper end of the wall 40a, as illustrated in FIG. 1.

As shown in FIG. 4, the pump means includes a pump piston generally indicated by the numeral 42 which is illustrated as being square in cross section so as to operate within the square cylinder 18. It will be understood, however, that the piston 42 may be round in cross section and the cylinder 18 may also be round in cross section. The illustrated piston 42 includes a pair of spaced apart side walls 43 which are fixedly secured by any suitable means, as by welding, to a bottom wall 44. The piston 42 is open at the rear end and at the top end. The front end of the piston 42 is enclosed by a partially fixed front wall portion 45 which is secured across the upper edges of the side walls 43 by any suitable means, as by welding. A pair of fixed hinge portions 46 are fixedly secured, as by welding, to the outer ends of the front wall fixed portion 45. A pair of movable hinged portions 47 are hingedly secured by a pair of suitable hinge pins 48 to the fixed hinge portions 46. The movable hinge portions 47 are fixedly secured as by welding to a swinging gate 49 which forms the rest of the front wall of the piston 42. The upper edge of the gate 49 is beveled, as indicated by the numeral 49a, to prevent binding when the gate 49 closes.

As shown in FIG. 4, the means for operating the piston 42 includes a pair of yoke arms 50 which have their inner ends pivotally mounted on suitable yoke pivot bearings 52 which are secured by any suitable means to the piston side walls 43 and which extend inwardly from the walls 43. The outer ends of the yoke arms 50 are fixedly secured by any suitable means, as by suitable bolts and nuts 53, to the lower end of a suitable connecting rod 54. As shown in FIGS. 3 and 4, the connecting rod 54 is illustrated as being formed from an elongated channel bar.

As shown in FIG. 3, the upper end of the connecting rod 54 is rotatably connected by a bearing block 55 and a suitable shaft 56, in the form of a suitable bolt and nut, to a circular eccentric plate 57. The eccentric plate 57 is suitably secured to a rotatable output shaft 58 of a suitable worm gear reducer means generally indicated by the numeral 59. A suitable worm gear reducer means is one available on the market from the Durst Corporation of Beloit, Wisconsin under model No. A-110.

As shown in FIGS. 1 and 3, the input shaft of the worm gear reducer means 59 is operatively connected by a suitable connector shaft 60 to the output shaft 61 of a suitable electric drive motor 62. The drive motor 62 is suitably secured to a vertical motor support bracket 63. As shown in FIG. 1, a suitable flange 65 is secured to the back of the motor support bracket 63 by any suitable means as by welding. The flange 65 may be secured in any suitable manner, as by the bolt and nut means 66, to the floor 9. As shown in FIG. 1, a suitable cover means 64 may be provided to cover the motor 62 and worm gear reducer means 59. The cover 64 may be secured to the grate 19 by any suitable means, as by the bolt and nut means 68.

In use, the manure 20 is scraped or pushed over the grate 19 and it then falls into the collection pit 10, from where it falls by gravity down into the rear end of the pump piston 42. When the piston 42 is moved rearwardly or through the back-stroke, the manure 20 passes through the piston, and when the piston is moved forwardly, through the pressure stroke, the grate 19 will be swung to a closed position. The front end of the piston exerts a pressure on the manure ahead of the piston so as to force the manure in the conduit means forwardly. The length of the piston strokes and the size of the piston may be selected in accordance with the desired pumping capacity. It will be seen that the manure is delivered to the bottom of the pile 20a in the manure storage means or storage pit 40 and with a sufficient pressure to let the pile 20a expand like a large mushroom. It will be seen that fresh manure may be forced into the bottom of the pile 20a even in freezing weather during the winter season. The manure storage means 40 may be of any shape and it may be formed as a storage pit, or a tank made of appropriate materials. The conduit exit portion 36 may also be connected to the manure storage pit 40 through the side wall and adjacent a point near the bottom wall inner surface 38. The manure storage pit 40 may be called a pollution control apparatus since it permits manure to be stored during the winter season and spread on the ground at a time when ground conditions prevent run-off and prevent down-stream pollution by animal phosphates. The manure storage pit 40 may be made of any suitable size. A storage pit of a size 45 feet × 70 feet on the bottom thereof and with sloping sides so as to provide a depth of about 8 feet will hold about 1,700 cubic yards of manure and it will provide adequate winter storage for manure from 120 cows for 200 days. The conduit portions 21, 29 and 36 and the Tee fitting 24 form what may be termed first conduits, and the conduit 20 forms what may be termed a second conduit. The conduits are made from a suitable material, such as a plastic material.

While it will be apparent that the preferred embodiment of the invention herein disclosed is well calculated to fulfill the objects above stated, it will be appreciated that the invention is susceptible to modification, variation and change.

What is claimed is:

1. In a manure transfer and storage system for use in an animal housing building having a floor, the combination comprising:
   a. a manure collection pit disposed beneath the floor of said building for receiving manure removed from the floor of said building;
   b. a transfer means disposed under the building and connected to the lower end of the collection pit for transferring the manure from said collection pit to the exterior of the building;
   c. said collection pit including front, rear, and side walls which slope inwardly and downwardly so as to converge at a lower end;
   d. pump means having an inlet end connected to the lower end of the collection pit;
   e. power means for operating said pump;
   f. conduit means connected to the discharge end of said pump means for conducting manure pumped by said pump means from the collection pit to the exterior of the building;
   g. said pump means including,
      1. a downwardly sloping pump cylinder having its inlet end connected to the lower end of the collection pit, and its discharge end connected to said conduit means;
      2. a pump piston operated by said power means and operatively mounted in said pump cylinder for pushing manure entering said pump cylinder by gravity into said conduit means; and,
   h. said pump piston including,
      1. a hollow piston body having an open top end and an open rear end; and,
      2. a gate swingably mounted on a horizontal axis on the front end of the hollow piston body and operable to be swung to an open position when said power means moves the pump piston through a backstroke toward and into the collection pit to allow manure to pass by gravity from the pit into and through the hollow piston body into the pump cylinder, and when the pump piston is moved away from the collection pit into the pump cylinder through a pressure stroke by said power means the swinging gate is swung to a closed position and the manure in front of the pump piston is pushed into and through the conduit means.

2. The structure as defined in claim 1, including:
   a. a manure storage means located exteriorly of said building for storing manure in piles, and being operatively connected to said conduit means for receiving manure transferred from the collection pit by the pump means and conduit means.

3. The structure as defined in claim 2, wherein:
   a. said conduit means includes a first conduit connecting the discharge end of said pump means to said storage means; and,
   b. a second conduit having an inlet end connected to said first conduit, and extending upwardly and above the ground level and having a discharge end disposed at a spreader loading station for conducting manure from the pump means to a spreader; and,
   c. valve means for selectively controlling the flow of manure through said first and second conduits.

4. The structure as defined in claim 2, wherein:
   a. said conduit means is connected to said manure storage means so as to conduct manure into the bottom of the pile of manure in such storage means.

5. The structure as defined in claim 4, wherein:
   a. said manure storage means is provided with side walls to retain any run-off from the manure in the storage means.

6. The structure as defined in claim 1, wherein said power means includes:
   a. a yoke means having one end pivotally mounted to the inside of said hollow piston body;
   b. a connecting rod having one end connected to the other end of said yoke means;
   c. a gear reducer means having an output shaft;
   d. an electric motor for driving said gear reducer means;
   e. an eccentric means operatively mounted on the output shaft of said gear reducer means; and,
   f. the other end of said connecting rod being operatively attached to said eccentric means.

* * * * *

UNITED STATES PATENT OFFICE
CERTIFICATE OF CORRECTION

Patent No. 3,687,311    Dated August 29, 1972

Inventor(s) CLINTON A. NESSETH

It is certified that error appears in the above-identified patent and that said Letters Patent are hereby corrected as shown below:

Column 5, line 22, "grate 19" should be -- gate 49 --.

Signed and sealed this 13th day of February 1973.

(SEAL)
Attest:

EDWARD M. FLETCHER, JR.　　　　　　　　ROBERT GOTTSCHALK
Attesting Officer　　　　　　　　　　　　Commissioner of Patents